(12) United States Patent
Rofougaran

(10) Patent No.: US 7,697,899 B2
(45) Date of Patent: Apr. 13, 2010

(54) RFIC WITH ON-CHIP ACOUSTIC TRANSDUCER CIRCUIT

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 811 days.

(21) Appl. No.: 11/513,588

(22) Filed: Aug. 31, 2006

(65) Prior Publication Data
US 2008/0075193 A1   Mar. 27, 2008

(51) Int. Cl.
  H04B 1/38 (2006.01)
(52) U.S. Cl. .................. 455/73; 455/39; 455/550.1; 455/90.3; 455/207
(58) Field of Classification Search .............. 455/39, 455/73, 550.1, 553.1, 91, 131, 194.2, 190.1, 455/90.3, 207, 252.1
See application file for complete search history.

(56) References Cited

U.S. PATENT DOCUMENTS

| 6,067,363 | A  | * | 5/2000 | Dent .......................... 381/113 |
| 6,675,000 | B1 | * | 1/2004 | Ichikawa .................. 455/127.3 |
| 6,882,861 | B2 | * | 4/2005 | Panasik et al. ........... 455/553.1 |
| 2003/0060242 | A1 | * | 3/2003 | Dotzler ....................... 455/569 |
| 2006/0034478 | A1 | * | 2/2006 | Davenport .................. 381/381 |
| 2006/0172719 | A1 | * | 8/2006 | Chen et al. .................. 455/333 |

FOREIGN PATENT DOCUMENTS

CN    1473545    2/2004

OTHER PUBLICATIONS

Dr. Lynn Fuller, Motorola Professor; "Microelectromechanical Systems (MEMs) Applications—Microphones";Rochester Institute of Technology; Apr. 25, 2005 p. 1-43.
Wang et al.; Image Sensing Technology Based on CCD and CMOS; 1994-2009 China Academic Journal Electronic Publishing House; vol. 29 No. 3; May 2003; pp. 361-364.

* cited by examiner

*Primary Examiner*—Tuan A Pham
(74) *Attorney, Agent, or Firm*—Garlick Harrison & Markison

(57) ABSTRACT

An RFIC includes a transmit acoustic transducer, a digital conversion module, a transmit baseband module, an analog conversion module, an up-conversion module, a power amplifier circuit, a low noise amplifier circuit, a down-conversion module, a receive baseband processing module, and a receive acoustic transducer circuit. The transmit acoustic transducer circuit converts transmit sound waves into transmit electrical signals. The digital conversion module converts the transmit electrical signals into digital transmit audio signals and converts down-converted signals into digital receive baseband or low IF signals. The transmit baseband processing module converts the digital transmit audio signals into digital transmit baseband or low IF signals. The analog conversion module converts the digital transmit baseband or low IF signals into analog transmit baseband or low IF signals and converts digital receive audio signals into receive electrical signals. The up-conversion module converts the analog transmit baseband or low IF signals into up-converted signals. The power amplifier circuit amplifies the up-converted signals. The low noise amplifier circuit amplifies receive RF signals. The down-conversion module converts the amplified receive RF signals into the down-converted signals. The receive baseband processing module converts the digital receive baseband or low IF signals into the digital receive audio signals. The receive acoustic transducer circuit converts the receive electrical signals into receive sound waves.

17 Claims, 12 Drawing Sheets

RFIC WITH ON-CHIP ACOUSTIC TRANSDUCER CIRCUIT

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to wireless communication devices.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, ZigBee, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many applications of a radio transceiver, the raw data that is transmitted and/or received includes digitized audio signals (e.g., digitized voice, music files such as MP3 files, video files such as MPEG files, and/or a combination thereof). As is known, a microphone is used to capture analog audio signals and a speaker is used to render analog audio signals audible. As is known, analog audio signals captured by a microphone are biased to a particular level, amplified, and digitized (i.e., converted to digital signals and may further be encoded in accordance with an encoding format). As is further known, digitized audio signals are converted to analog audio signals, amplified via a volume control, and subsequently rendered audible by a speaker.

Recently, through the advent of Microelectromechanical Systems (MEMs), a few companies have developed microphone integrated circuits and speaker integrated circuits. For example, Akustica, as claimed on its web page (Akustica-.com), has developed an analog microphone chip (part no. AKU1000), a digital microphone chip (part no. AKU2000), and speaker chips. While integrated microphone chips and speaker chips offer communication device manufacturers smaller form factors, the chips are still separate components requiring printed circuit board (PCB) space and connections to and/or from other integrated circuits on the PCB.

Therefore, a need exists for a radio frequency integrated circuit that includes an on-chip acoustic transducer circuit.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
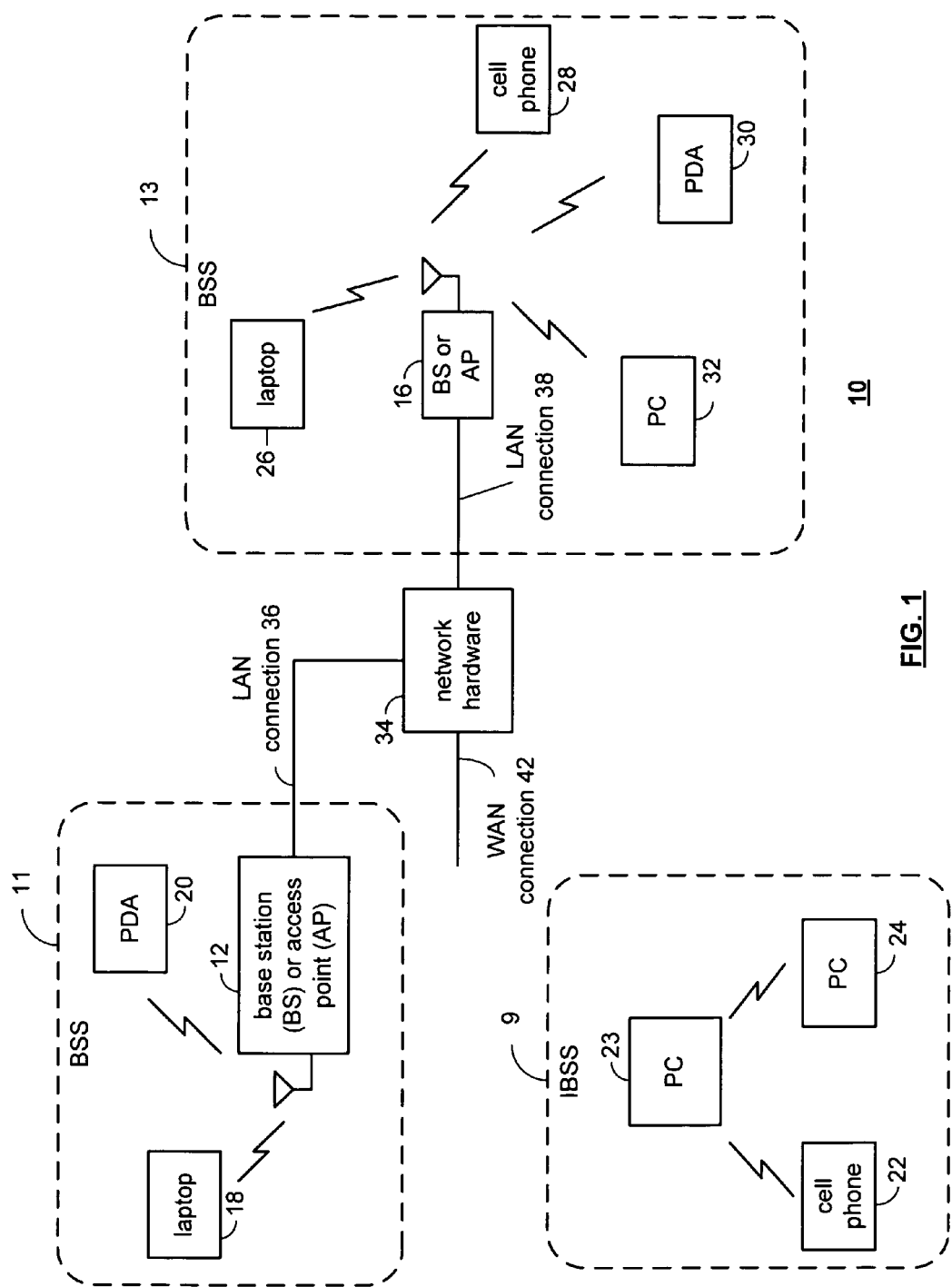
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28 that include a built in radio transceiver and/or have an associated radio transceiver. The details of the radio transceiver will be described in greater detail with reference to FIGS. 2-16.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points, or master transceivers, are used for in-home or in-building wireless networks (e.g., IEEE 802.11 and versions thereof, Bluetooth, RFID, and/or any other type of radio frequency based network protocol). Regardless of the particular type of communication system, each wireless communication device includes a built-in radio and/or is coupled to a radio. Note that one or more of the wireless communication devices may include an RFID reader and/or an RFID tag.

Figure 2:
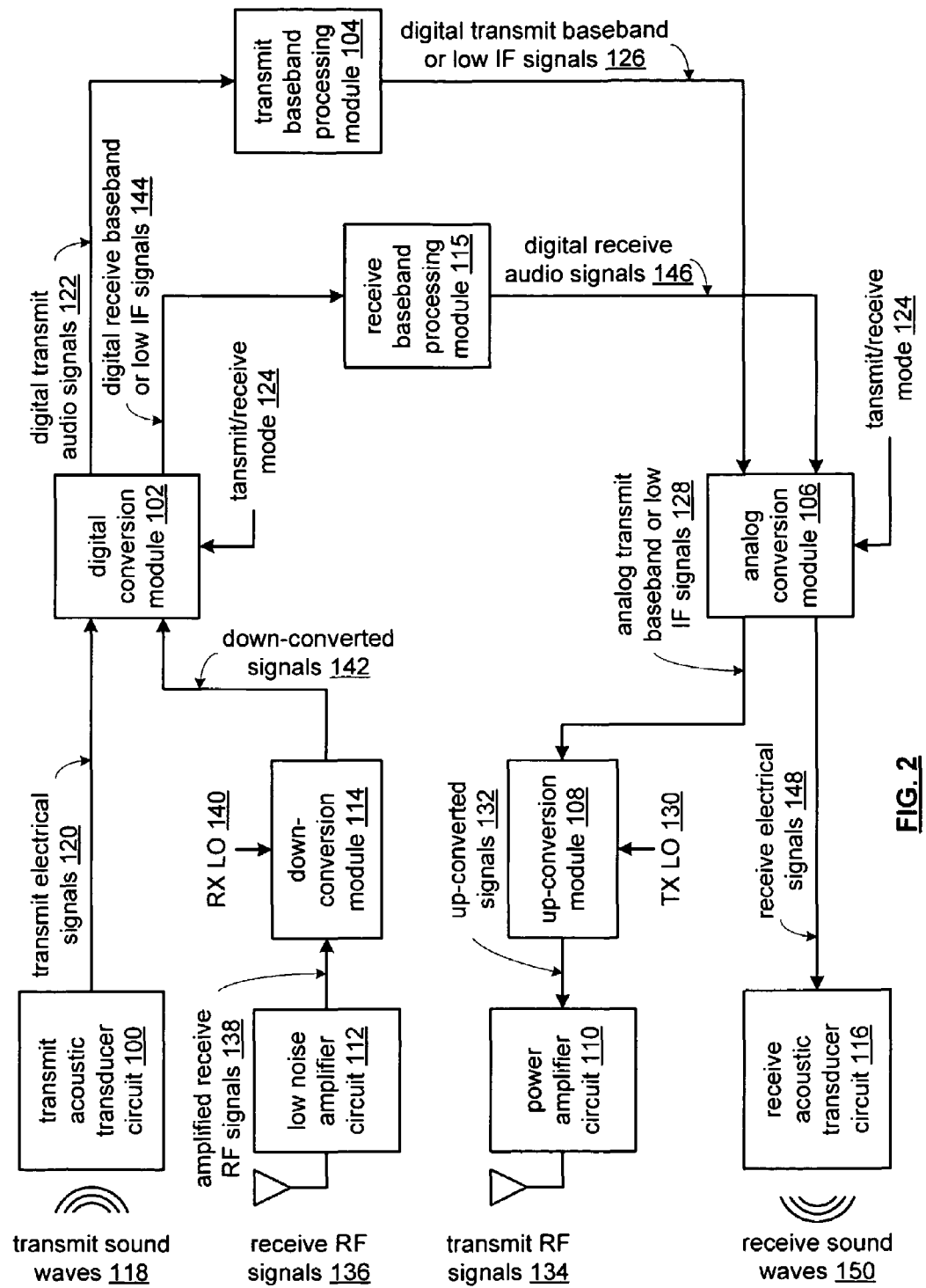
FIG. 2 is a schematic block diagram of a radio transceiver in accordance with the present invention.

FIG. 2 is a schematic block diagram of a radio frequency integrated circuit (RFIC) that may be used in any of the wireless communication devices of FIG. 1 or as a radio frequency transceiver for any other RF application where audio signals are transmitted and/or received. The RFIC includes a transmit acoustic transducer 100, a digital conversion module 102, a transmit baseband module 104, an analog conversion module 106, an up-conversion module 108, a power amplifier circuit 110, a low noise amplifier circuit 112, a down-conversion module 114, a receive baseband processing module 115, and a receive acoustic transducer circuit 118.

The transmit acoustic transducer circuit 100 (embodiments of which will be described in greater detail with reference to FIGS. 3 and 4) is coupled to convert transmit sound waves 118 into transmit electrical signals 120. The transmit sound waves 118, which may result from human speech and/or any other source that produces a wave transmitted through the air, cause mechanical vibrations within the transmit acoustic transducer circuit 100. The transmit acoustic transducer circuit 100 converts the mechanical vibrations into the transmit electrical signals 120.

The digital conversion module 102 (embodiments of which will be described in greater detail with reference to FIGS. 7-10) is coupled to convert the transmit electrical signals 120 into digital transmit audio signals 122 when the RFIC is in a transmit mode. The digital transmit audio signals 122 may be encoded in accordance with one or more encoding schemes, such as Pulse Code Modulation (PCM) A-law, PCM μ-law, and continuous variable slope delta demodulation. Note that the RFIC may be in the transmit mode via a transmit/receive mode signal 124, may be in the transmit mode in accordance with a half duplex scheme where the transmit path and receive path of the RFIC share a wireless communication resource (e.g., one or more RF channels, use the same RF carrier frequency, frequency hopping scheme, etc.), and/or may be in the transmit mode simultaneously with the receive mode when the RFIC supports a full duplex scheme where the transmit path utilizes a different wireless communication resource than the receive path.

The transmit baseband processing module 104 is coupled to convert the digital transmit audio signals 122 into digital transmit baseband or low intermediate frequency (IF) signals 126 in accordance with one or more wireless communication standards. To achieve the conversion to the digital transmit baseband or low IF signals 126, the transmit baseband processing module 104 may perform one or more transmitter functions upon the digital transmit audio signals 122. The transmitter functions include, but are not limited to, scrambling, encoding, puncturing, mapping, modulation, and/or digital baseband to IF conversion. Note that the baseband or low IF TX signals 164 may be digital baseband signals (e.g., have a zero IF) or digital low IF signals, where the low IF typically will be in a frequency range of one hundred kilohertz to a few megahertz. Further note that the transmit baseband processing module 104 and the receive baseband processing module 115 may be implemented using a shared processing device, individual processing devices, or a plurality of processing devices and may further included associated memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 104 and/or 116 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The analog conversion module 106 (embodiments of which will be described in greater detail with reference to FIGS. 11-14) is coupled to convert the digital transmit baseband or low IF signals 126 into analog transmit baseband or low IF signals 128 when the RFIC is in the transmit mode.

The up-conversion module 108 is coupled to convert the analog transmit baseband or low IF signals 128, which may include in-phase components and quadrature components, into up-converted signals 132 based on a transmit local oscillation 130. The up-conversion module 108 may be a direct conversion module where the transmit local oscillation 130 corresponds to the difference between the IF of the analog transmit baseband or low IF signals 128 and the carrier frequency of the transmit RF signals 134. Alternatively, the up-conversion module 108 may be a superheterodyne module where the transmit local oscillation 130 includes two oscillations: one to convert the analog baseband or low IF signals 128 into intermediate frequency signals and a second to convert the intermediate frequency signals into signals having the carrier frequency of the transmit RF signals 134. Note that when the analog transmit baseband or low IF signals 128 includes in-phase components and quadrature components, the transmit local oscillation 130 includes an in-phase component and a quadrature component such that the quadrature component of the transmit local oscillation is mixed with the quadrature components of the analog transmit baseband or low IF signals 128 and the in-phase component of the transmit local oscillation is mixed with the in-phase components of the analog transmit baseband or low IF signals 128.

The power amplifier circuit 110 is coupled to amplify the up-converted signals to produce the transmit radio frequency (RF) signals 134. The power amplifier circuit 110 may include one or more power amplifiers and/or one or more pre-amplifiers coupled in series, in parallel or combination thereof. The amplification provided by the power amplifier circuit 110 is dependent upon the desired transmit power and whether an off-chip power amplifier is used. The power amplifier circuit 110 provides the transmit RF signals 134 to an antenna structure for over-the-air transmission.

The antenna structure may include a separate antenna(s) for the receive path and the transmit path of the RFIC or the transmit and receive paths may share an antenna(s) via a transmit/receive switch and/or transformer balun. In another embodiment, the receive and transmit paths may share a diversity antenna structure. In another embodiment, the receive and transmit paths may each have its own diversity antenna structure. In another embodiment, the receive and transmit paths may share a multiple input multiple output (MIMO) antenna structure. Accordingly, the antenna structure coupled to, or integrated on, the RFIC will depend on the particular standard(s) to which the wireless transceiver is compliant.

The low noise amplifier (LNA) circuit 112 is coupled to amplify receive RF signals 136 to produce amplified receive RF signals 138. The LNA circuit 112 may include one or more amplifiers and/or one or more pre-amplifiers coupled in series, in parallel, or a combination thereof to amplify the receive RF signals 136 based on a gain setting. The gain setting is at least partially dependent upon the signal strength of the receive RF signals 136 and the desired operating range of the receive path.

The down-conversion module 114 is coupled to convert the amplified receive RF signals 138 into the down-converted signals 142 based on a receive local oscillation 140. The down-conversion module 114 may be a direct conversion module where the receive local oscillation 140 corresponds to a difference between the IF of the down-converted signals 142 (e.g., a zero IF or a low IF of a few Mega Hertz or less) and the carrier frequency of the receive RF signals 136. Alternatively, the down-conversion module 114 may be a superheterodyne module where the receive local oscillation 140 includes two oscillations: one to convert the receive RF signals 136 into intermediate frequency signals and a second to convert the intermediate frequency signals into the down-converted signals 142. Note that LNA circuit 112 may provide in-phase components and quadrature components of the amplified receive RF signals 138 to the down-conversion module 114. In this instance, the receive local oscillation 140 includes an in-phase component and a quadrature component such that the quadrature component of the receive local oscillation 140 is mixed with the quadrature components of the amplified receive RF signals 138 and the in-phase component of the receive local oscillation 140 is mixed with the in-phase components of the amplified receive RF signals 138.

The digital conversion module 102 converts the down-converted signals 142 into digital receive baseband or low intermediate frequency (IF) signals 144 when the RFIC is in a receive mode. Note that the RFIC may be in the receive mode via a transmit/receive mode signal 124, may be in the receive mode in accordance with a half duplex scheme where the transmit path and receive path of the RFIC share a wireless communication resource (e.g., one or more RF channels, use the same RF carrier frequency, frequency hopping scheme, etc.), and/or may be in the receive mode simultaneously with the transmit mode when the RFIC supports a full duplex scheme where the transmit path utilizes a different wireless communication resource than the receive path.

The receive baseband processing module 115 is coupled to convert the digital receive baseband or low IF signals 144 into the digital receive audio signals 146. To achieve the conversion to the digital receive audio signals 146, the receive baseband processing module 115 may perform one or more receiver functions upon the digital receive baseband or low IF signals 144. The receiver functions include, but are not limited to, digital intermediate frequency to baseband conversion, demodulation, demapping, depuncturing, decoding, and/or descrambling. Note that the digital receive baseband or low IF signals 144 may be digital baseband signals (e.g., have a zero IF) or digital low IF signals, where the low IF typically will be in a frequency range of one hundred kilohertz to a few megahertz.

The analog conversion module 106 converts the digital receive audio signals 146 into receive electrical signals 148 when the RFIC is in the receive mode. Such a conversion may include decoding using one or more decoding schemes, which may include Pulse Code Modulation (PCM) A-law, PCM μ-law, and continuous variable slope delta demodulation.

The receive acoustic transducer circuit 116 (embodiments of which will be described in greater detail with reference to FIGS. 3 and 4) is coupled to convert the receive electrical signals 148 into receive sound waves 150. The receive sound waves 150 are the result of mechanical vibrations within the receive acoustic transducer circuit 116 in response to the receive electrical signals 148.

As one of ordinary skill in the art will appreciate, the RFIC may be fabricated on a single die and placed within a conventional integrated circuit (IC) package (e.g., ball grid array, surface mount, etc.). Alternatively, the RFIC may be fabricated on two dies that are placed within a single conventional IC package. For instance, a first die may support the transmit acoustic transducer circuit 100, the digital conversion module 102, the transmit baseband processing module 104, the analog conversion module 106, the receive baseband processing module 115, and the receive acoustic transducer circuit 116 and a second die that supports the up-conversion module 108, the power amplifier circuit 110, the low noise amplifier circuit 112, and the down-conversion module 114. As another alternative, the RFIC may be fabricated on two dies that are placed in separate conventional IC package.

Figure 3:
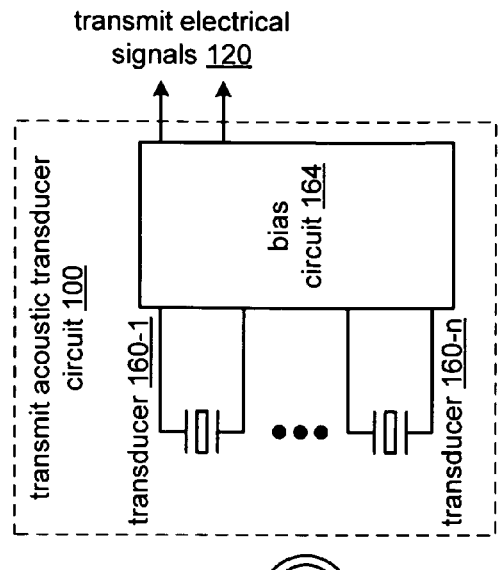
FIGS. 3 and 4 are schematic block diagrams of various embodiments of a transmit acoustic transducer circuit in accordance with the present invention.

FIG. 3 is a schematic block diagram of an embodiment of the transmit acoustic transducer circuit 100 that includes a transducer 160 and a bias circuit 162. The biasing circuit 162 is coupled to the transducer 160 to provide a desired bias level for the transducer 160. The transducer 160, which may be a capacitive transducer, a Microelectromechanical Systems (MEMs) microphone, and/or a floating electrode capacitive microphone, converts the transmit sounds waves 118 into the transmit electrical signals 120 based on the biasing provided by the bias circuit 162.

Figure 4:
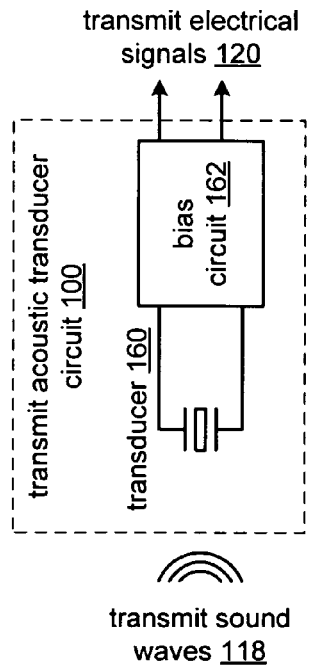

FIG. 4 is a schematic block diagram of an embodiment of the transmit acoustic transducer circuit 100 that includes a plurality of transducers 160-1 through 160-$n$ and a biasing circuit 164. The plurality of transducers 160-1 through 160-$n$ may be coupled in parallel, coupled in an array, or function separately. When the plurality of transducers 160-1 through 160-$n$ are coupled in parallel, the bias circuit 164 provides a common biasing to the transducers such that the transducers may convert the transmit sounds waves 118 into the transmit electrical signals 120. When the plurality of transducers 160-1 through 160-$n$ are coupled in an array, the bias circuit 164 provides a common biasing or a biasing based on the structure of the array to the transducers such that the transducers may convert the transmit sounds waves 118 into the transmit electrical signals 120. When the plurality of transducers 160-1 through 160-$n$ function separately, the bias circuit 164 provides separate biasing to the transducers such each of the transducers produces electrical signals from the transmit sounds waves 118 and the bias circuit combines the electrical signals to produce the transmit electrical signals 120. Note that the transducers 160-1 through 160-$n$ may be capacitive transducers, Microelectromechanical Systems (MEMs) microphones, and/or floating electrode capacitive microphones.

Figure 5:
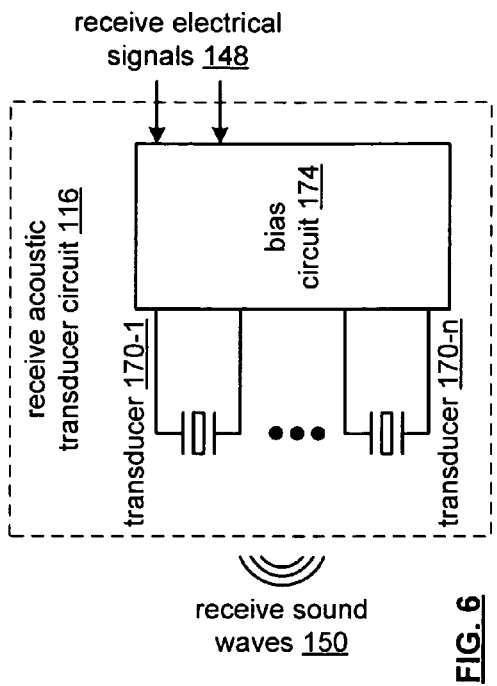
FIGS. 5 and 6 are schematic block diagrams of various embodiments of a receive acoustic transducer circuit in accordance with the present invention.

FIG. 5 is a schematic block diagram of an embodiment of the receive acoustic transducer circuit 116 that includes a transducer 170 and a bias circuit 172. The biasing circuit 172 is coupled to the transducer 170 to provide a desired bias level for the transducer 170. The transducer 170, which may be a capacitive transducer, a Microelectromechanical Systems (MEMs) speaker, and/or a floating electrode capacitive speaker, converts the receive electrical signals 148 into the receive sounds waves 150 based on the biasing provided by the bias circuit 172.

Figure 6:
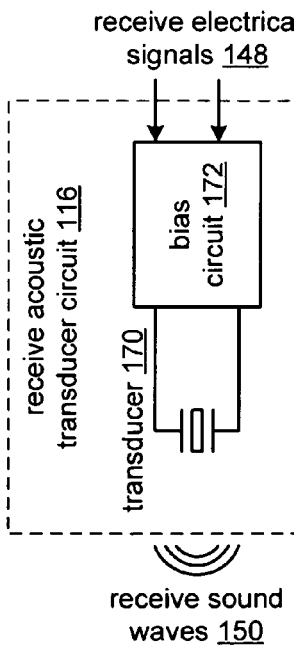

FIG. 6 is a schematic block diagram of an embodiment of the receive acoustic transducer circuit 116 that includes a plurality of transducers 170-1 through 170-$n$ and a biasing circuit 174. The plurality of transducers 170-1 through 170-$n$ may be coupled in parallel, coupled in an array, or function separately. When the plurality of transducers 170-1 through 170-$n$ are coupled in parallel, the bias circuit 174 provides a common biasing to the transducers such that the transducers may convert the receive electrical signals 148 into the receive sounds waves 150. When the plurality of transducers 170-1 through 170-$n$ are coupled in an array, the bias circuit 174 provides a common biasing or a biasing based on the structure of the array to the transducers such that the transducers may convert the receive electrical signals 148 into the receive sounds waves 150. When the plurality of transducers 170-1 through 170-$n$ function separately, the bias circuit 174 provides separate biasing to the transducers such each of the transducers produces sound waves from the receive electrical signals 148 as provided by the biasing circuit 174. Note that the transducers 170-1 through 170-$n$ may be capacitive transducers, Microelectromechanical Systems (MEMs) speakers, and/or floating electrode capacitive speakers.

Figure 7:
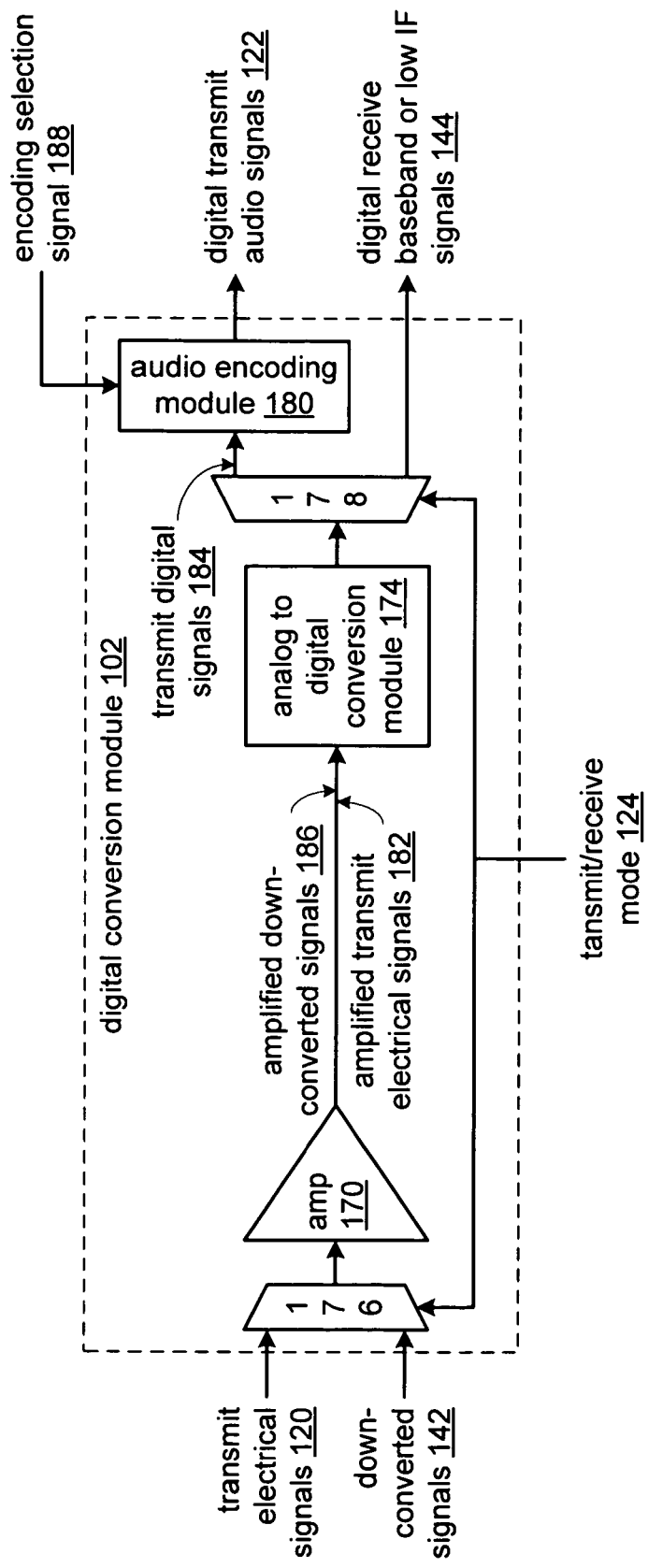
FIGS. 7-10 are schematic block diagrams of various embodiments of a digital conversion module in accordance with the present invention.

FIG. 7 is a schematic block diagram of an embodiment of the digital conversion module 102 that includes a multiplexer 176, an amplifier 170, an analog to digital conversion module 174, a multiplexer 178, and an audio encoding module 180. The multiplexers 176 and 178, which may be switches, gates, connection nodes, and/or multiplexers, are controlled by the status of the transmit/receive mode signal 124. Note that when the RFIC is in a half duplex mode, the transmit/receive mode signal 124 may be inherent in the RFIC based on whether the transmit path is active or the receive path is active. In this instance, the multiplexers 176 and 178 may be implemented as the connection nodes (i.e., electrically connection with one line active and the other inactive in accordance with the RFIC half duplex operation).

When the RFIC is in the transmit mode, multiplexer 176 provides the transmit electrical signals 120 to the amplifier 170. The amplifier 170 amplifies the transmit electrical signals 120 in accordance with a pre-established gain setting or an automatic gain control setting to produce amplified transmit electric signals 182. The analog to digital conversion module 174, which may include one or more analog to digital converters, is coupled to convert the amplified transmit electrical signals 182 into transmit digital signals 184. Multiplexer 178 provides the transmit digital signals 184 to the audio encoding module 180.

The audio encoding module 180 may be a separate processing device from the transmit baseband processing module 104, may share a processing device with the transmit baseband processing module 104, or may be a module within the transmit baseband processing module 104. Regardless of the specific implementation, the audio encoding module 180 perform one or more types of audio encoding upon the transmit digital signals 184 to produce the digital transmit audio signals 122. Such encoding includes A-law pulse code modulation, μ-law pulse code modulation, and/or continuous variable slope delta modulation. In one embodiment, the audio encoding module 180 includes an input for receiving an audio encoding selection signal 188 which indicates the particular type of audio encoding it is to perform.

When the RFIC is in the receive mode, the multiplexer 176 provides the down-converted signals 142 to the amplifier 170. The amplifier 170 amplifies the down-converted signals 142 in accordance with an automatic gain control setting to produce amplified down-converted signals 186. Note that if the down-converted signals 142 include in-phase components and quadrature components, the amplifier 170 includes an in-phase amplifier to amplify the in-phase components and a quadrature amplifier to amplify the quadrature components.

The analog to digital conversion module 174 converts the amplified down-converted signals 186 into the digital receive baseband or low IF signals 144. Note that when the down-converted signals 142 include in-phase components and quadrature components, the analog to digital conversion module 174 includes an in-phase analog to digital converter to convert the in-phase components and a quadrature analog to digital converter to convert the quadrature components. Multiplexer 178 provides the digital receive baseband or low IF signals 144 to the receive baseband processing module 115.

Figure 8:
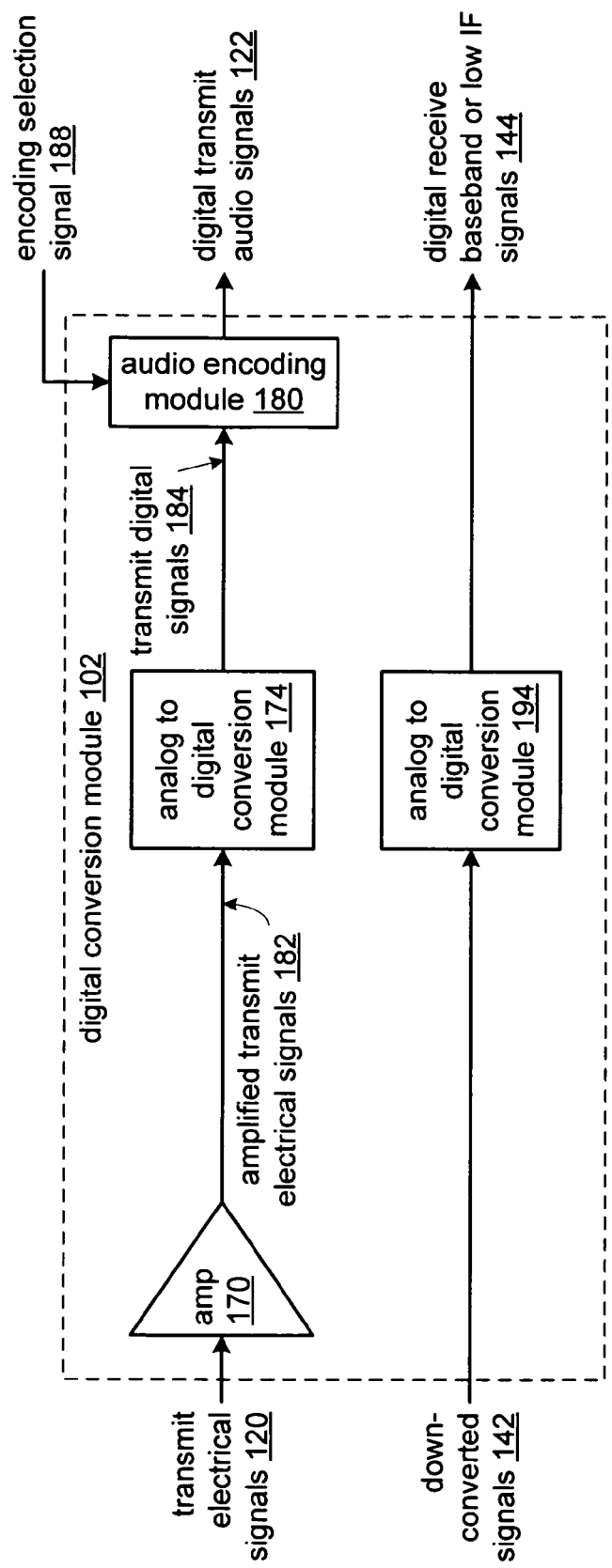

FIG. 8 is a schematic block diagram of an embodiment of the digital conversion module 102 that includes an amplifier 170, an analog to digital conversion (ADC) module 174, a an analog to digital conversion module 194, and the audio encoding module 180. In this embodiment, when the RFIC is in the transmit mode, the amplifier 170, ADC module 174, and the audio encoding module 180 are active, while the ADC module 194 is inactive and when the RFIC is in the receive mode, the amplifier 170, ADC module 174, and the audio encoding module 180 are inactive, while the ADC module 194 is active.

When the RFIC is in the transmit mode, the amplifier 170 amplifies the transmit electrical signals 120 in accordance with a pre-established gain setting or an automatic gain control setting to produce amplified transmit electric signals 182. The analog to digital conversion module 174, which may include one or more analog to digital converters, is coupled to convert the amplified transmit electrical signals 182 into transmit digital signals 184. The audio encoding module 180 perform one or more types of audio encoding upon the transmit digital signals 184 to produce the digital transmit audio signals 122. Such encoding includes A-law pulse code modulation, μ-law pulse code modulation, and/or continuous variable slope delta modulation. In one embodiment, the audio encoding module 180 includes an input for receiving an audio encoding selection signal 188 which indicates the particular type of audio encoding it is to perform.

When the RFIC is in the receive mode, the analog to digital conversion module 194 converts the down-converted signals 142 into the digital receive baseband or low IF signals 144. Note that when the down-converted signals 142 include in-phase components and quadrature components, the analog to digital conversion module 194 includes an in-phase analog to digital converter to convert the in-phase components and a quadrature analog to digital converter to convert the quadrature components.

Figure 9:
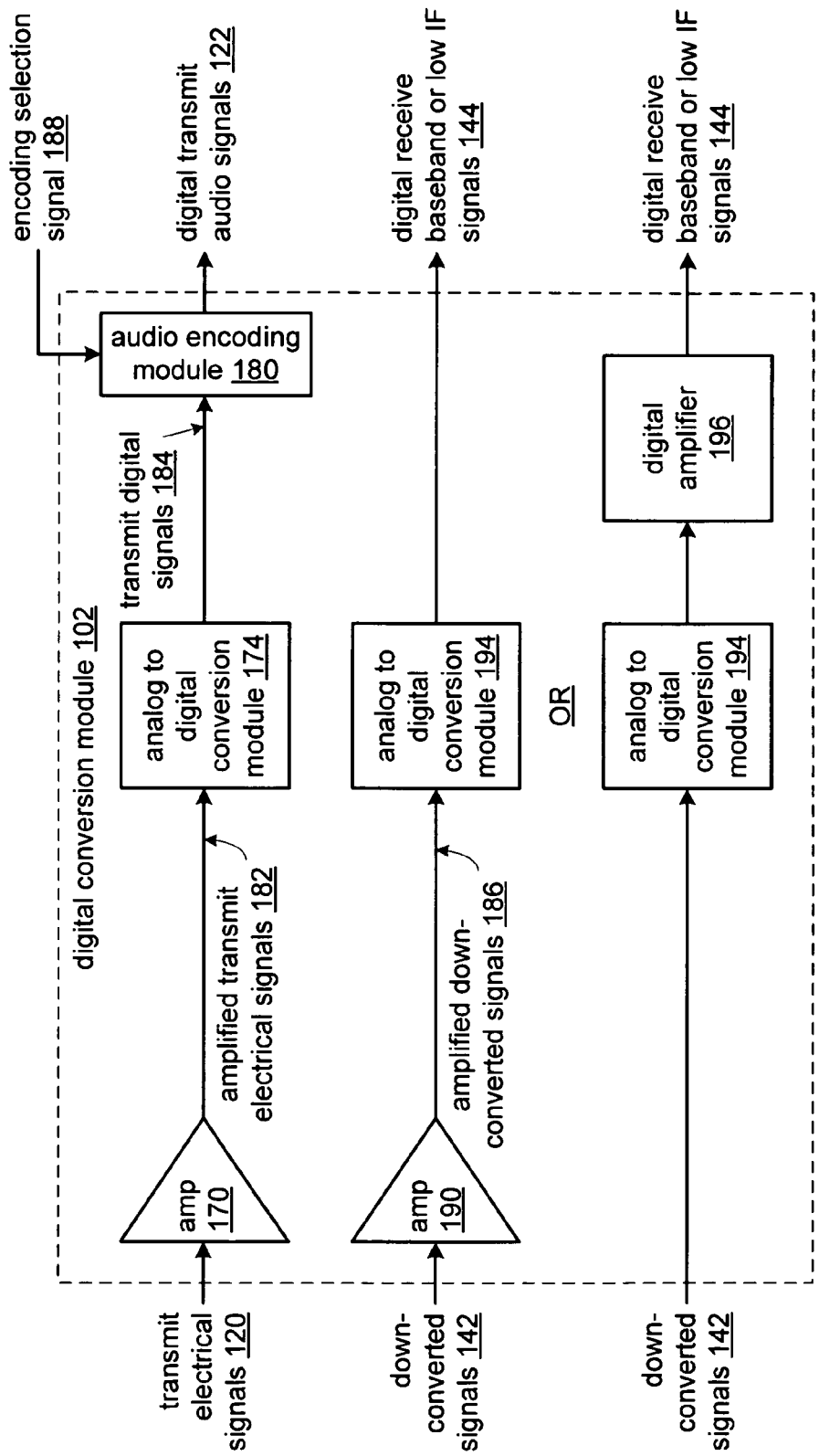

FIG. 9 is a schematic block diagram of an embodiment of the digital conversion module 102 that includes amplifier 170, the analog to digital conversion module 174, the audio encoding module 180, the analog to digital conversion module 194, amplifier 190 or digital amplifier 196. In this embodiment, when the RFIC is in the transmit mode, the amplifier 170, ADC module 174, and the audio encoding module 180 are active, while the ADC module 194 and the amplifier 190 or digital amplifier 196 are inactive and when the RFIC is in the receive mode, the amplifier 170, ADC module 174, and the audio encoding module 180 are inactive, while the ADC module 194 and the amplifier 190 or digital amplifier 196 are active.

When the RFIC is in the transmit mode, the amplifier 170 amplifies the transmit electrical signals 120 in accordance with a pre-established gain setting or an automatic gain control setting to produce amplified transmit electric signals 182. The analog to digital conversion module 174, which may include one or more analog to digital converters, is coupled to convert the amplified transmit electrical signals 182 into transmit digital signals 184. The audio encoding module 180 perform one or more types of audio encoding upon the transmit digital signals 184 to produce the digital transmit audio signals 122. Such encoding includes A-law pulse code modulation, μ-law pulse code modulation, and/or continuous variable slope delta modulation. In one embodiment, the audio encoding module 180 includes an input for receiving an audio encoding selection signal 188 which indicates the particular type of audio encoding it is to perform.

When the RFIC is in the receive mode, the amplifier 190 amplifies the down-converted signals 142 to produce amplified down-converted signals 186. The analog to digital conversion module 194 converts the amplified down-converted signals 186 into the digital receive baseband or low IF signals 144. Note that when the down-converted signals 142 include in-phase components and quadrature components, the analog to digital conversion module 194 includes an in-phase analog to digital converter to convert the in-phase components and a quadrature analog to digital converter to convert the quadrature components. In an alternative embodiment, the analog to digital conversion module 194 converts the amplified down-converted signals 186 into pre-amplified digital receive baseband or low IF signals. The digital amplifier 196 amplifies the pre-amplified digital receive baseband or low IF signals to produce the digital receive baseband or low IF signals 144.

Figure 10:
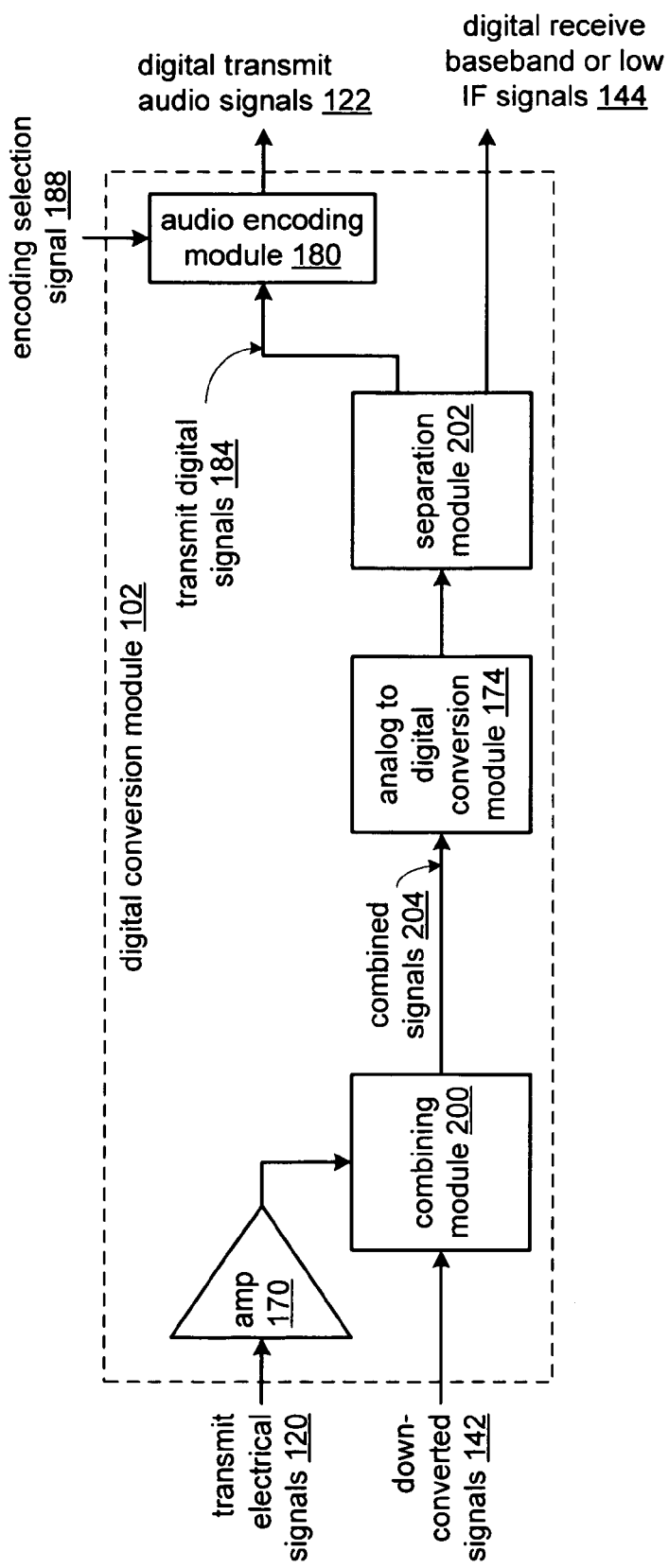

FIG. 10 is a schematic block diagram of an embodiment of the digital conversion module 102 that includes amplifier 170, a combining module 200, the analog to digital conversion module 174, a separation module 202, and the audio encoding module 180. In this embodiment, the RFIC is in a full duplex mode (i.e., simultaneously in the receive mode and transmit mode) where the transmit path uses a different frequency range than the receive path.

In this embodiment, the amplifier 170 amplifies the transmit electrical signals 120 based on a pre-determined gain setting and/or an automatic gain control setting to produce amplified transmit electrical signals 120. The combining module 200 combines the amplified transmit electrical signals with the down-converted signals 142 to produce combined signals 204. For example, the combining module 200 may be a summation module that sums the amplified transmit electrical signals (e.g., $\cos(\alpha t)$) with the down-converted signals 142 (e.g., $\cos(\omega_{IF} t)$) to produce the combined signals ($2 \cos \frac{1}{2}(\alpha t + \omega_{IF} t) \cos \frac{1}{2}(\alpha t - \omega_{IF} t) = \cos^2 \alpha t - \sin^2 \omega_{IF} t$). Note that if the down-converted signals 142 include in-phase and quadrature components, the combining module 200 may combine the amplified transmit electrical signals with the in-phase components and/or the quadrature components.

The analog to digital conversion module 174 converts the combined signals 204 into digital combined signals. The separation module 202 separates the digital combined signals into the transmit digital signals 184 and the digital receive baseband or low IF signals 144. In one embodiment, the separation module 200 may include a first digital filter and a second digital filter. The first digital filter is tuned to pass the $\cos^2 \alpha t$ component of the combined signals 204 while substantially attenuating the $\sin^2 \omega_{IF} t$ component of the combined signals 204 and the second digital filter is tuned to pass the $\sin^2 \omega_{IF} t$ component of the combined signals 204 while substantially attenuating the $\cos^2 \alpha t$ component of the combined signals 204. The separation module 200 may further include a digital square root function to obtain $\cos \alpha t$ and $\sin \omega_{IF} t$ and may further include a digital 90° phase shift module to phase shift $\sin \omega_{IF} t$ to obtain $\cos \omega_{IF} t$.

The audio encoding module 180 perform one or more types of audio encoding upon the transmit digital signals 184 to produce the digital transmit audio signals 122. Such encoding includes A-law pulse code modulation, μ-law pulse code modulation, and/or continuous variable slope delta modulation. In one embodiment, the audio encoding module 180 includes an input for receiving an audio encoding selection signal 188 which indicates the particular type of audio encoding it is to perform.

Figure 11:
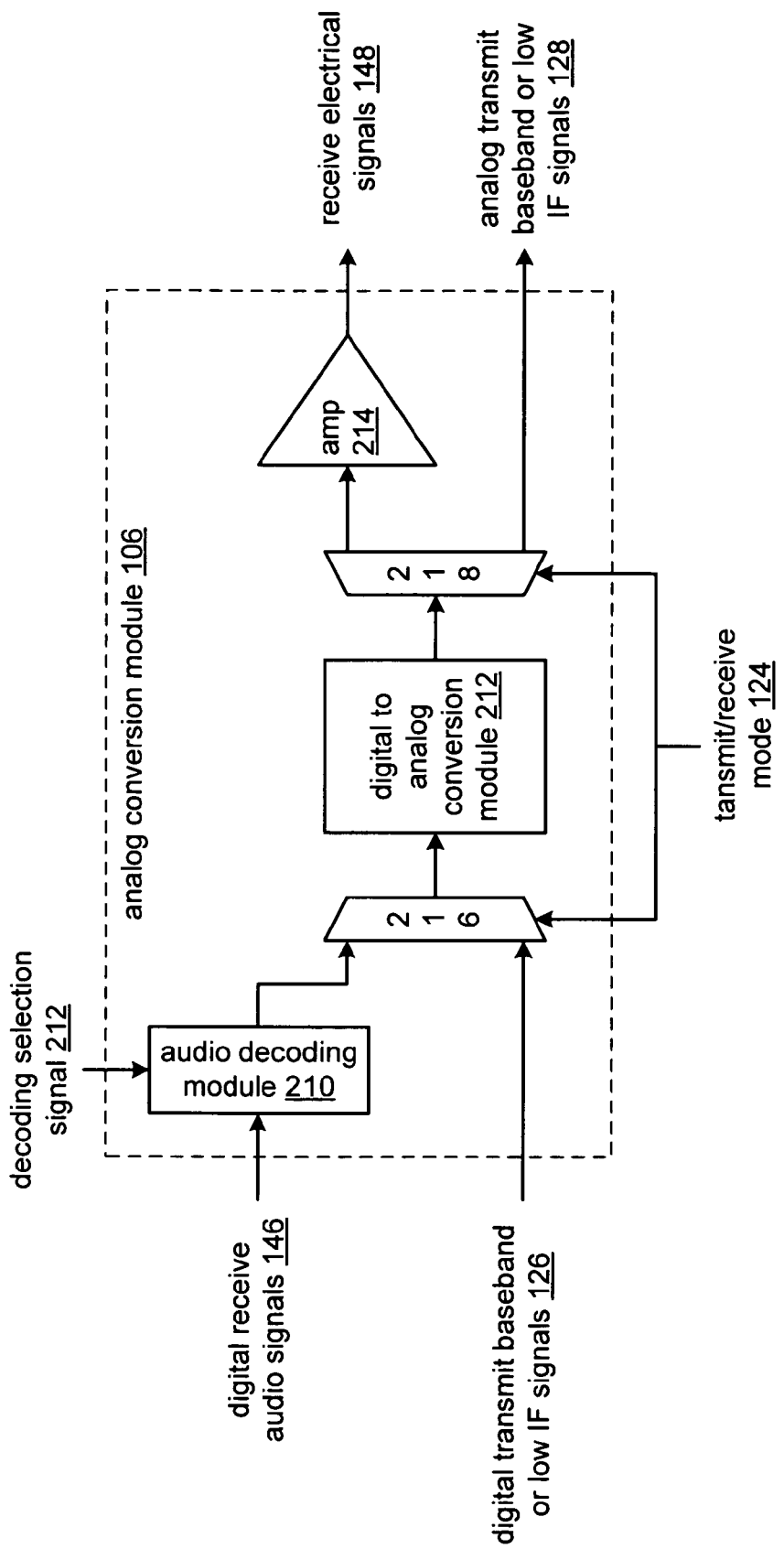
FIGS. 11-14 are schematic block diagrams of various embodiments of an analog conversion module in accordance with the present invention.

FIG. 11 is a schematic block diagram of an embodiment of the analog conversion module 106 that includes an audio decoding module 210, a multiplexer 216, a digital to analog conversion module 212, a multiplexer 218, and an amplifier 214. The multiplexers 216 and 218, which may be switches, gates, connection nodes, and/or multiplexers, are controlled by the status of the transmit/receive mode signal 124. Note that when the RFIC is in a half duplex mode, the transmit/receive mode signal 124 may be inherent in the RFIC based on whether the transmit path is active or the receive path is active. In this instance, the multiplexers 216 and 218 may be implemented as the connection nodes (i.e., electrically connection with one line active and the other inactive in accordance with the RFIC half duplex operation).

When the RFIC is in the receive mode, the audio decoding module 210 decodes the digital receive audio signals 146 in accordance with an audio decoding scheme, which may be A-law pulse code demodulation, μ-law pulse code demodulation, and continuous variable slope delta demodulation. In one embodiment, the audio decoding module 210 may include an input for receiving an audio decoding selection signal 212 that indicates the particular type of audio decoding to be performed. Note that the audio decoding module 210 may be a separate processing device from the receive baseband processing module 116, may share a processing device with the receive baseband processing module 116, or may be a module within the receive baseband processing module 116.

In the receive mode, multiplexer 216 provides the decoded receive audio signals from the audio decoding module 210 to the digital to analog conversion (DAC) module 212. The DAC module 212 may include one or more digital to analog converts to convert the decoded receive audio signals into analog decoded audio signals. The amplifier 214 amplifies the analog decoded audio signals in accordance with a pre-determined gain setting and/or an automatic gain control setting to produce the receive electrical signals 148.

When the RFIC is in the transmit mode, multiplexer 216 provides the digital transmit baseband or low IF signals 126 to the DAC module 212. The transmit baseband or low IF signals 126 may include in-phase components and quadrature components. In such an instance, the DAC module 212 would include two digital to analog converters: one for the in-phase components and another for the quadrature components. Once converted, multiplexer 218 provides the analog transmit baseband or low IF signals 128 to the up-conversion module 108. Note that the analog transmit baseband or low IF signals 128 may be amplified and/or filtered prior to or after multiplexer 218.

Figure 12:
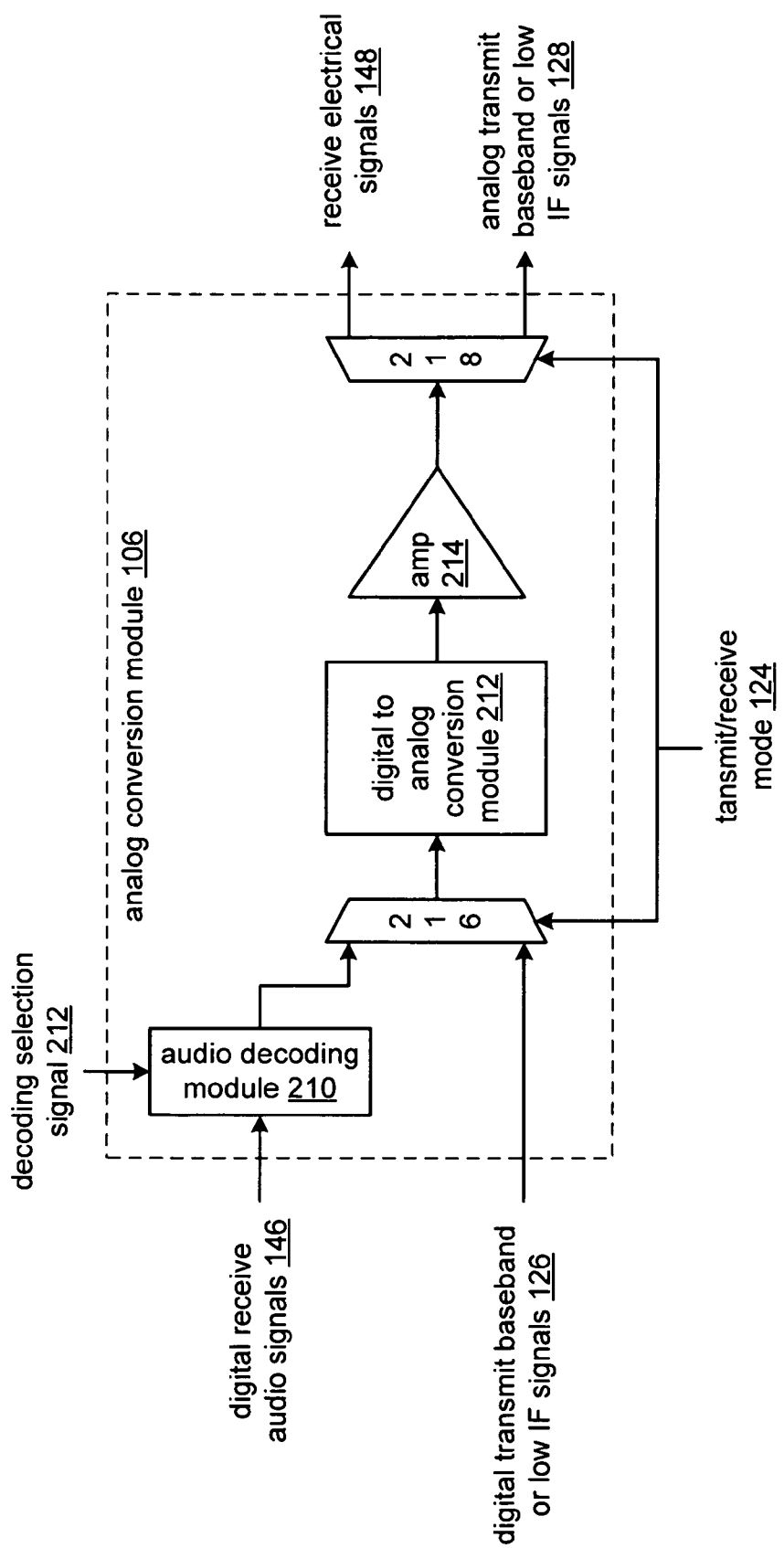

FIG. 12 is a schematic block diagram of an embodiment of the analog conversion module 106 that includes an audio decoding module 210, a multiplexer 216, a digital to analog conversion module 212, a multiplexer 218, and an amplifier 214. This embodiment is similar to the embodiment of FIG. 11 with the exception that amplifier 214 is coupled to the DAC module 212 and the output of the amplifier 214 provides the input to the multiplexer 218.

Figure 13:
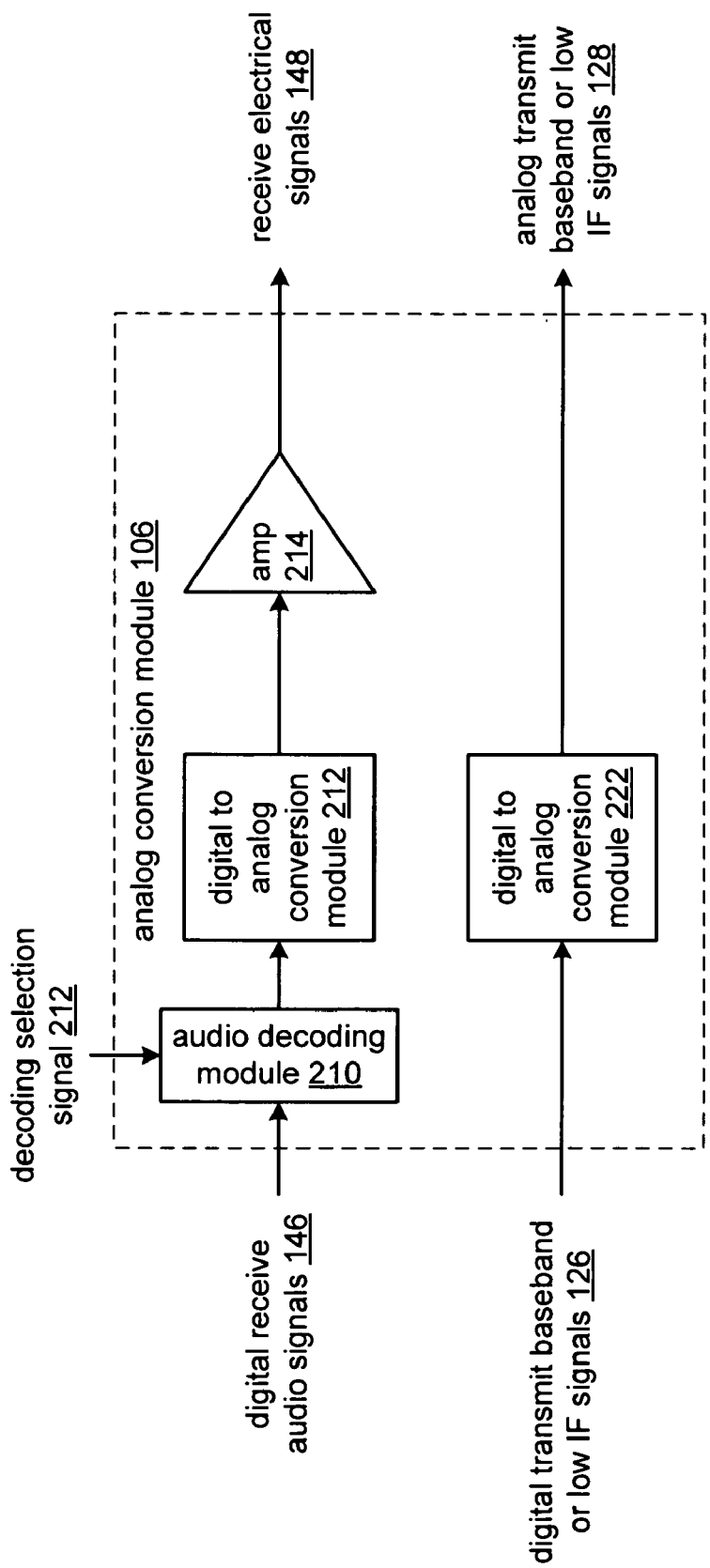

FIG. 13 is a schematic block diagram of an embodiment of the analog conversion module 106 that includes the audio decoding module 210, the DAC module 212, the amplifier 214, and a second DAC module 222. In this embodiment, when the RFIC is in the receive mode, the audio decoding module 210, the DAC module 212, and the amplifier 214 are active, while the DAC module 222 is inactive and when the RFIC is in the transmit mode, audio decoding module 210, the DAC module 212, and the amplifier 214 are inactive, while the DAC module 222 is active.

When the RFIC is in the receive mode, the audio decoding module 210 decodes the digital receive audio signals 146 in accordance with an audio decoding scheme, which may be A-law pulse code demodulation, μ-law pulse code demodulation, and continuous variable slope delta demodulation. In one embodiment, the audio decoding module 210 may include an input for receiving an audio decoding selection signal 212 that indicates the particular type of audio decoding to be performed. The DAC module 212 may include one or more digital to analog converts to convert the decoded receive audio signals into analog decoded audio signals. The amplifier 214 amplifies the analog decoded audio signals in accordance with a pre-determined gain setting and/or an automatic gain control setting to produce the receive electrical signals 148.

When the RFIC is in the transmit mode, the DAC module 222 converts the digital transmit baseband or low IF signals 126 into analog transmit baseband or low IF signals 128. The transmit baseband or low IF signals 126 may include in-phase components and quadrature components. In such an instance, the DAC module 222 would include two digital to analog converters: one for the in-phase components and another for the quadrature components.

Figure 14:
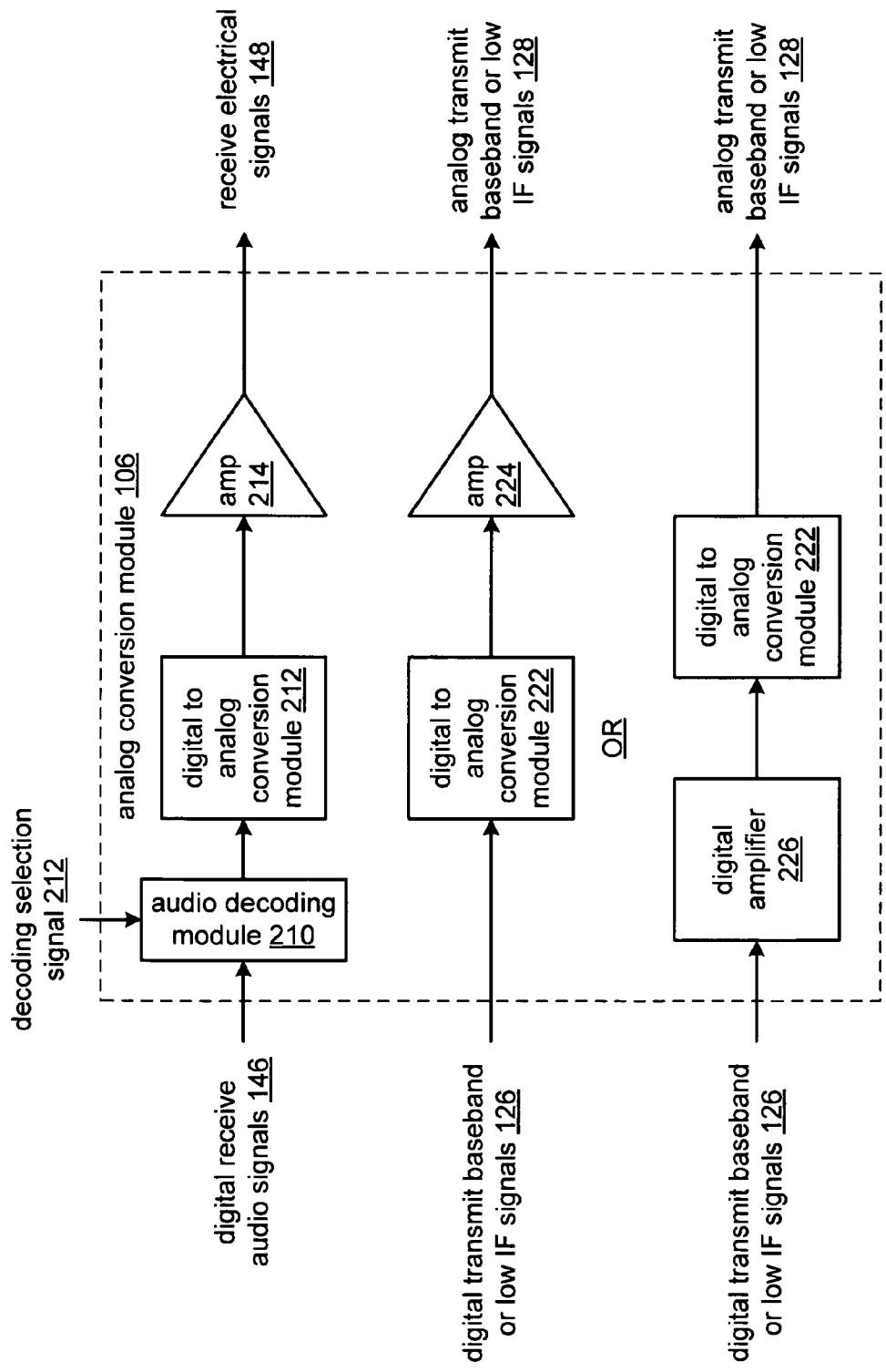

FIG. 14 is a schematic block diagram of an embodiment of the analog conversion module 106 that includes the audio decoding module 210, the DAC module 212, the amplifier 214, the second DAC module 222, an amplifier 224 or a digital amplifier 226. In this embodiment, when the RFIC is in the receive mode, the audio decoding module 210, the DAC module 212, and the amplifier 214 are active, while the DAC module 222, the amplifier 224, and the digital amplifier 226 are inactive and when the RFIC is in transmit mode, audio decoding module 210, the DAC module 212, and the amplifier 214 are inactive, while the DAC module 222, the amplifier 224, and the digital amplifier 226 are active.

When the RFIC is in the receive mode, the audio decoding module 210 decodes the digital receive audio signals 146 in accordance with an audio decoding scheme, which may be A-law pulse code demodulation, μ-law pulse code demodulation, and continuous variable slope delta demodulation. In one embodiment, the audio decoding module 210 may include an input for receiving an audio decoding selection signal 212 that indicates the particular type of audio decoding to be performed. The DAC module 212 may include one or more digital to analog converts to convert the decoded receive audio signals into analog decoded audio signals. The amplifier 214 amplifies the analog decoded audio signals in accordance with a pre-determined gain setting and/or an automatic gain control setting to produce the receive electrical signals 148.

When the RFIC is in the transmit mode, the DAC module 222 converts the digital transmit baseband or low IF signals 126 into pre-amplified analog transmit baseband or low IF signals. In one embodiment, the amplifier 224 amplifies the pre-amplified analog transmit baseband or low IF signals to produce the analog transmit baseband or low IF signals 128. In an alternate embodiment, the digital amplifier 226 amplifies the digital transmit baseband or low IF signals 126 prior to the DAC module 222 converting the signals into the analog transmit baseband or low IF signals 128.

Figure 15:
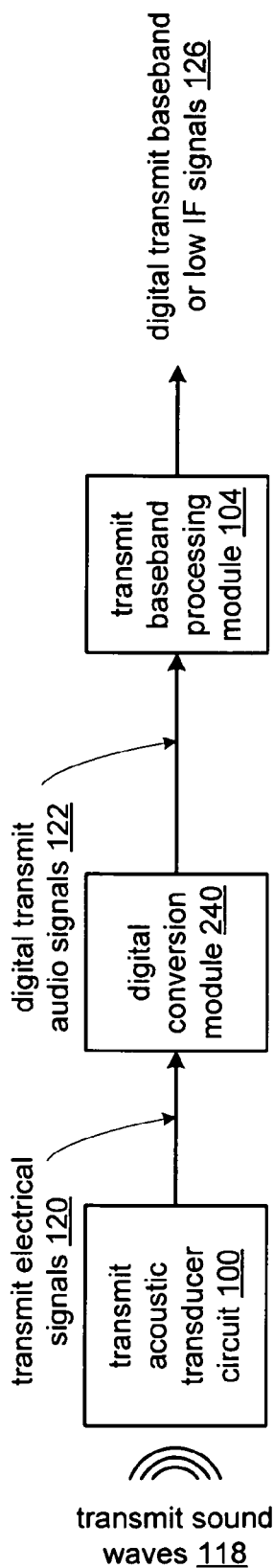
FIG. 15 is a schematic block diagram of a radio transmitter integrated circuit in accordance with the present invention.

FIG. 15 is a schematic block diagram of a radio transmitter integrated circuit that includes the transmit acoustic transducer circuit 100, a digital conversion module 240, and the transmit baseband processing module 104. In this embodiment, the transmit acoustic transducer circuit 100 converts transmit sound waves 118 into transmit electrical signals 120. The digital conversion module 240, which may be implemented via amplifier 170, analog to digital conversion module 174, and audio encoding module of FIGS. 8 and 9, converts the transmit electrical signals 120 into the digital transmit audio signals 240.

The transmit baseband processing module 104 converts the digital transmit audio signals 122 into the digital transmit baseband or low IF signals 126. Note that the radio transmitter integrated circuit may further include an analog conversion module, which may include DAC module 222 of FIGS. 13 and 14, an up-conversion module 108, and/or a power amplifier circuit 110. Further note that the analog conversion module may include amplifier 224 and/or digital amplifier 226 of FIG. 14.

Figure 16:
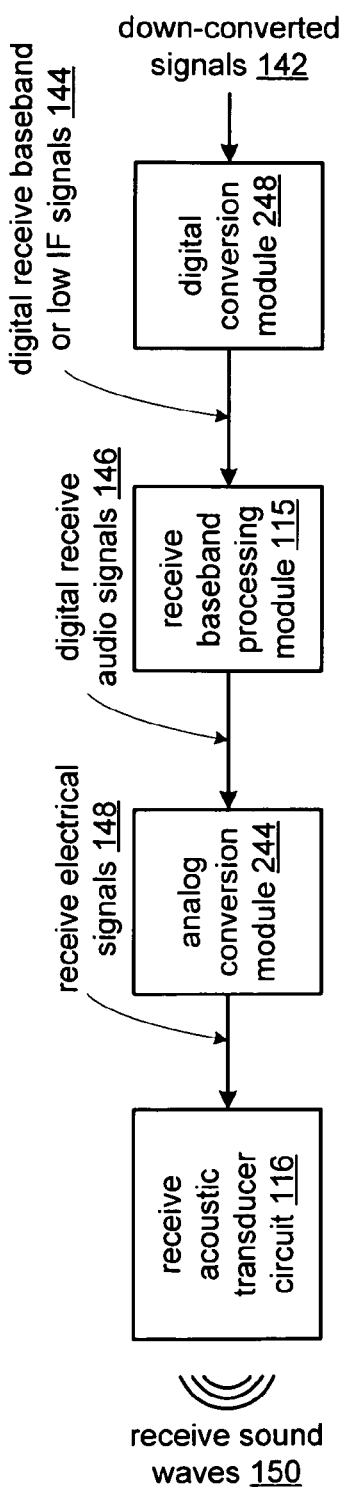
FIG. 16 is a schematic block diagram of a radio receiver integrated circuit in accordance with the present invention.

FIG. 16 is a schematic block diagram of a radio receiver integrated circuit that includes a digital conversion module 248, the receive baseband processing module 115, an analog conversion module 244, and the receive acoustic transducer circuit 116. The digital conversion module 248, which may be implemented via the ADC module 194 of FIGS. 8 and 9, converts the down-converted signals 142 into the digital receive baseband or low IF signals 144. Note that the digital conversion module 248 may further include amplifier 190 and/or digital amplifier 196.

The receive baseband processing module 115 convert the digital receive baseband or low IF signals 144 into the digital receive audio signals 146. The analog conversion module 244, which may be implemented via audio decoding module 210, DAC module 212, and amplifier 214 of FIGS. 13 and 14, converts the digital receive audio signals 146 into the receive electrical signals 148. The receive acoustic transducer circuit 116 converts the receive electrical signals 148 into receive sound waves 150. Note that the radio receiver integrated circuit may further include the down-conversion module 114 and the low noise amplifier circuit 112.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency integrated circuit (RFIC) comprises:
a transmit acoustic transducer circuit coupled to convert transmit sound waves into transmit electrical signals;
a down-conversion module coupled to convert received radio frequency (RF) signals into down-converted signals;
a digital conversion module coupled to convert the transmit electrical signals into digital transmit audio signals for transmitting and to convert the down-converted signals into digital receive baseband or low intermediate frequency (IF) signals for receiving, the digital conversion module including a combining module coupled to combine the transmit electrical signals with the down-converted signals to produce combined signals, an analog to digital conversion module coupled to convert the combined signals into digital combined signals, and a separation module coupled to separate the digital combined signals into the digital transmit audio signals and digital receive baseband or low IF signals;
a transmit baseband processing module coupled to convert the digital transmit audio signals into digital transmit baseband or low IF signals;
a receive baseband processing module coupled to convert the digital receive baseband or low IF signals into digital receive audio signals;
an analog conversion module coupled to convert the digital transmit baseband or low IF signals into analog transmit baseband or low IF signals for transmitting and to convert the digital receive audio signals into receive electrical signals for receiving;

an up-conversion module coupled to convert the analog transmit baseband or low IF signals into up-converted signals;

a power amplifier circuit coupled to amplify the up-converted signals to produce transmit RF signals; and a receive acoustic transducer circuit coupled to convert the receive electrical signals into receive sound waves.

2. The RFIC of claim 1, wherein the transmit acoustic transducer circuit comprises:

a transducer; and a bias circuit coupled to the transducer, wherein the transducer converts, based on biasing provided by the bias circuit, the transmit sounds waves into the transmit electrical signals.

3. The RFIC of claim 2, wherein the transducer comprises at least one of:

a capacitive transducer;

a Microelectromechanical Systems (MEMs) microphone;

a floating electrode capacitive microphone.

4. The RFIC of claim 1, wherein the transmit acoustic transducer circuit comprises:

a plurality of transducers; and a bias circuit coupled to the plurality of transducers, wherein the plurality of transducers converts, based on biasing provided by the bias circuit, the transmit sounds waves into the transmit electrical signals.

5. The RFIC of claim 1, wherein the receive acoustic transducer circuit comprises:

a transducer; and a bias circuit coupled to the transducer, wherein the transducer converts, based on biasing provided by the bias circuit, the receive electrical signals into the receive sounds waves.

6. The RFIC of claim 5, wherein the transducer comprises at least one of:

a capacitive transducer;

a Microelectromechanical Systems (MEMs) speaker;

a floating electrode capacitive speaker.

7. The RFIC of claim 1, wherein the receive acoustic transducer circuit comprises:

a plurality of transducers; and a bias circuit coupled to the plurality of transducers, wherein the plurality of transducers converts, based on biasing provided by the bias circuit, the receive electrical signals into the receive sounds waves.

8. The RFIC of claim 1, wherein the digital conversion module further includes an audio encoding module coupled to encode the digital transmit audio signals.

9. The RFIC of claim 8, wherein audio encoding module comprises:

an input for receiving an audio encoding selection signal, wherein the audio encoding selection signal indicates at least one of: A-law pulse code modulation, μ-law pulse code modulation, and continuous variable slope delta modulation.

10. The RFIC of claim 1, wherein the transmit RF signals are within a transmit frequency band and the receive RF signals are within a receive frequency band such that the RFIC is simultaneously transmitting and receiving.

11. The RFIC of claim 1, wherein the analog conversion module comprises:

an audio decoding module coupled to convert the digital receive audio signals into receive digital signals;

a digital to analog conversion module coupled to convert the receive digital signals into pre-amplified receive electrical signals and to convert the digital transmit baseband or low IF signals into the analog transmit baseband or low IF signals; and an amplifier coupled to amplified the pre-amplified receive electrical signals to produce the receive electrical signals.

12. The RFIC of claim 11, wherein the amplifier is further coupled to:

amplify the analog transmit baseband or low IF signals.

13. The RFIC of claim 11, wherein audio decoding module comprises:

an input for receiving an audio decoding selection signal, wherein the audio decoding selection signal indicates at least one of: A-law pulse code demodulation, μ-law pulse code demodulation, and continuous variable slope delta demodulation.

14. The RFIC of claim 1, wherein the analog conversion module comprises:

an audio decoding module coupled to convert the digital receive audio signals into receive digital signals;

a first digital to analog conversion module coupled to convert the receive digital signals into pre-amplified receive electrical signals;

a second digital to analog conversion module coupled to convert the digital transmit baseband or low IF signals into the analog transmit baseband or low IF signals; and an amplifier coupled to amplified the pre-amplified receive electrical signals to produce the receive electrical signals.

15. The RFIC of claim 14, wherein the analog conversion module further comprises:

a second amplifier coupled to amplify the analog transmit baseband or low IF signals.

16. The RFIC of claim 14, wherein the analog conversion module further comprises:

a digital amplifier coupled to amplify the digital transmit baseband or low IF signals prior to the second digital to analog conversion module converting the digital transmit baseband or low IF signals into the analog transmit baseband or low IF signals.

17. The RFIC of claim 1 comprises:

a first die that supports the transmit acoustic transducer circuit, the digital conversion module, the transmit baseband processing module, the analog conversion module, the receive baseband processing module, and the receive acoustic transducer circuit;

a second die that supports the up-conversion module, the power amplifier circuit, and the down-conversion module; and a package that supports the first and second dies.

* * * * *